United States Patent
Milliken

(10) Patent No.: US 7,512,780 B1
(45) Date of Patent: Mar. 31, 2009

(54) PACKET-PARALLEL HIGH PERFORMANCE CRYPTOGRAPHY SYSTEMS AND METHODS

(75) Inventor: Walter Clark Milliken, Dover, NH (US)

(73) Assignees: Verizon Corporate Services Group, Inc., New York, NY (US); BBN Technologies Corp., Cambridge, MA (US)

( * ) Notice: Subject to any disclaimer, the term of this patent is extended or adjusted under 35 U.S.C. 154(b) by 1617 days.

(21) Appl. No.: 10/166,547

(22) Filed: Jun. 10, 2002

Related U.S. Application Data

(60) Provisional application No. 60/316,574, filed on Aug. 31, 2001.

(51) Int. Cl.
H04L 9/34 (2006.01)
G06F 3/00 (2006.01)
G06F 1/02 (2006.01)

(52) U.S. Cl. .......................... 713/153; 713/189; 714/4; 710/57; 706/256

(58) Field of Classification Search ................. 713/153, 713/189; 714/4; 710/57; 708/256
See application file for complete search history.

(56) References Cited

U.S. PATENT DOCUMENTS

| | | | | |
|---|---|---|---|---|
| 4,663,706 A * | 5/1987 | Allen et al. | ................. | 709/234 |
| 4,980,913 A * | 12/1990 | Skret | .......................... | 713/153 |
| 5,920,732 A * | 7/1999 | Riddle | .......................... | 710/56 |
| 6,026,451 A * | 2/2000 | Sreenivas | ..................... | 710/39 |
| 6,101,255 A * | 8/2000 | Harrison et al. | ............... | 380/52 |
| 6,160,819 A * | 12/2000 | Partridge et al. | ............ | 370/474 |
| 6,246,684 B1 * | 6/2001 | Chapman et al. | ............ | 370/394 |
| 6,477,646 B1 * | 11/2002 | Krishna et al. | .............. | 713/189 |
| 6,918,117 B2 * | 7/2005 | Mayfield | ..................... | 718/105 |
| 6,925,078 B1 * | 8/2005 | Sherer et al. | ................. | 370/389 |
| 2002/0152374 A1 * | 10/2002 | Mayfield | ..................... | 713/153 |
| 2002/0184498 A1 * | 12/2002 | Qi | ............................... | 713/168 |
| 2003/0014627 A1 * | 1/2003 | Krishna et al. | .............. | 713/153 |
| 2003/0035372 A1 * | 2/2003 | Schaub | ....................... | 370/230 |
| 2005/0198531 A1 * | 9/2005 | Kaniz et al. | .................. | 713/201 |

OTHER PUBLICATIONS

Schneier, Bruce. Applied Cryptography, Seconed Edition. 1996 John Wiley & Sons, Inc., pp. 278-279, 355, 420 & 456.*
Unknown. "Crypto++ 3.1 Benchmarks". May 1999, <http://web.archive.org/web/19990502122401/http://www.eskimo.com/~weidai/benchmarks.html>.*
Burke, Jerome et al. "Architectural Support for Fast Symmetric-Key Cryptography", (2000).*
Mraz, Ron. "Secure Blue: An Architecture for a Scalable, Reliable High Volume SSL Internet Server", IBM, (2001).*
Pierson, Lyndon G. et al. "Context-Agile Encryption for High Speed Communication Networks", Jan. 1999, ACM.*

(Continued)

*Primary Examiner*—Michael J Simitoski

(57) ABSTRACT

A cryptographic system (500) includes cryptographic sub-units (510) and associated input buffers (520) connected to a scheduler (530) and a reassembler (540). The scheduler (530) receives packets, where each of the packets includes one or more data blocks, and assigns each of the packets to one of the sub-units (510). The input buffers (520) temporarily store the packets from the scheduler (530). Each of the sub-units (510) performs a cryptographic operation on the data blocks from the associated input buffer (520) to form transformed blocks. The reassembler (540) receives the transformed blocks from the sub-units (510), reassembles the packets from the transformed blocks, and outputs the reassembled packets in a same order in which the packets were received by the scheduler (530).

22 Claims, 11 Drawing Sheets

OTHER PUBLICATIONS

Sholander, Peter et al. "The Effect of Algorithm-Agile Encryption on ATM Quality of Service", 1997 IEEE.*

Wu, Lisa et al. "CryptoManiac: A Fast Flexible Architecture for Secure Communication", Jun. 2001.*

S. Kent et al., "Security Architecture for the Internet Protocol," Network Working Group, Request for Comments: 2401, Nov. 1998, pp. 1-58.

* cited by examiner

FIG. 9
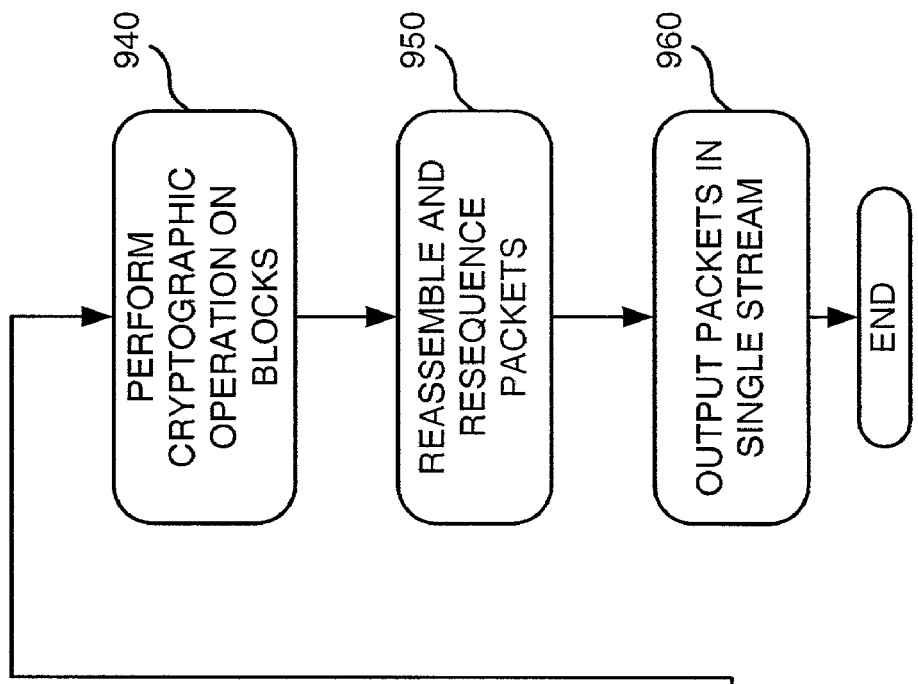
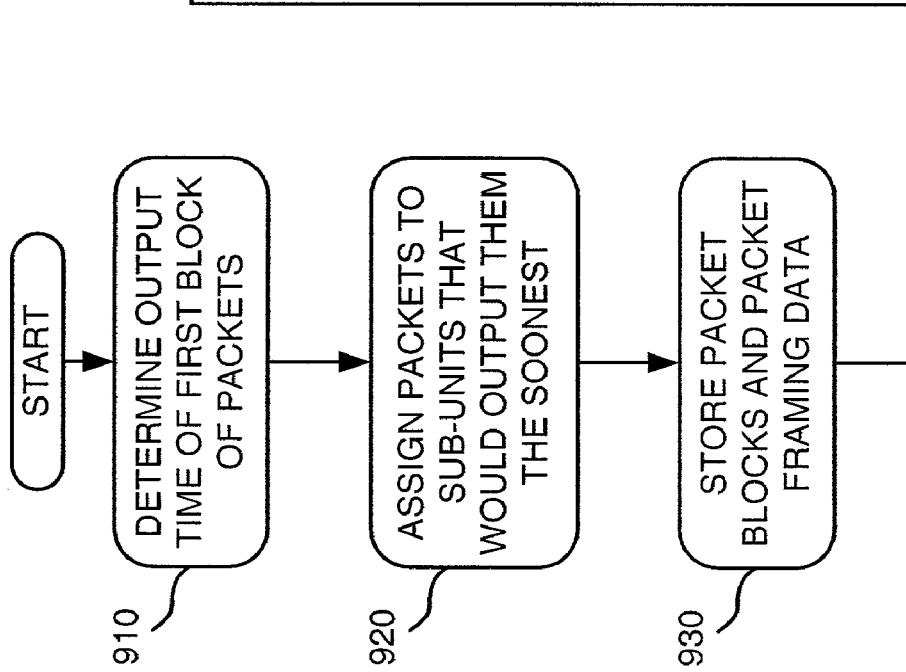

PACKET-PARALLEL HIGH PERFORMANCE CRYPTOGRAPHY SYSTEMS AND METHODS

RELATED APPLICATION

This application claims priority under 35 U.S.C. § 119 based on U.S. Provisional Application No. 60/316,574, filed Aug. 31, 2001, the disclosure of which is incorporated herein by reference.

GOVERNMENT INTEREST

The U.S. Government may have a paid-up license in this invention and the right in limited circumstances to require the patent owner to license others on reasonable terms as provided for by the terms of Contract No. MDA 904-00-C-2123.

BACKGROUND OF THE INVENTION

1. Field of the Invention

The present invention relates generally to cryptography and, more particularly, to systems and methods that provide high performance cryptography.

2. Description of Related Art

Compared to network data transmission, cryptographic protection of data is a computationally-intensive task. There is a need, however, for network-speed cryptography to support the Secure Internet Protocol (IPsec) security standard for data protection between entities communicating over the Internet. This has lead to the development of cryptography units employing multiple cryptography engines, whose aggregate performance matches network data rates.

Existing parallel cryptography units employ one of three techniques to achieve higher performance: pipelined, block-parallel, and flow-parallel techniques. FIG. 1 is a diagram of a conventional pipelined system 100 that operates upon blocks of a packet. Each packet is broken into multiple fixed-sized data blocks before being operated upon by pipelined system 100.

Pipelined system 100 includes a series of cryptography stages 110 that perform a cryptographic (e.g., encryption or decryption) operation on data blocks of a packet. Each of cryptography stages 110 performs part of the cryptographic operation (f(X)) on a data block and passes it onto the next stage for the next part of the cryptographic operation. If the pipelined system 100 includes four cryptography stages 110, the portions of the cryptographic operation performed by the four cryptographic stages 110 may be represented by f1(X), f2(X), f3(X), and f4(X), respectively. In this case, the cryptographic operation may be defined as: f(X)=f4(f3(f2(f1(X)))).

FIG. 2 is a diagram of a conventional block-parallel system 200 that operates upon multiple blocks of a packet in parallel. Block-parallel system 200 includes multiple cryptographic sub-units 210 connected in parallel between demultiplexer 220 and multiplexer 230. Demultiplexer 220 delivers a new data block arriving for encryption or decryption to a currently unused cryptographic sub-unit 210. Demultiplexer 220 typically uses a round robin technique to select a sub-unit 210, since the cryptographic operation usually takes the same amount of time for each data block. Each of sub-units 210 performs a cryptographic operation on its data block and outputs the result to multiplexer 230. Multiplexer 230 multiplexes the results from sub-units 210 together into a single stream.

FIG. 3 is a diagram of a conventional flow-parallel system 300 that operates upon multiple packets in parallel. Unlike the other systems 100 and 200, flow-parallel system 300 operates upon units of packets rather than units of data blocks. Flow-parallel system 300 includes multiple cryptographic sub-units 310 connected in parallel via input buffers 320 and output buffers 330 to demultiplexer 340 and multiplexer 350.

Demultiplexer 340 uses information within the packet to be encrypted or decrypted to select a sub-unit 310 to process the packet. When IPsec is used, demultiplexer 340 normally uses the Security Association (SA) to which the packet belongs in determining which sub-unit 310 to select. There is typically a different SA for each remote entity with which the network device is communicating. Other characteristics of a packet, such as the TCP connection to which it belongs, can also be used.

Demultiplexer 340 stores the packet in an input buffer 320 of the selected sub-unit 310. Input buffer 320 typically includes a first-in first-out (FIFO) memory. Sub-unit 310 performs a cryptographic operation (e.g., encryption or decryption) on the packet and stores the result in output buffer 330. Output buffer 330 typically includes a FIFO memory. Multiplexer 350 receives packets from output buffers 330 and multiplexes them together into a single stream.

Pipelined and block-parallel systems suffer from an inability to handle common cryptographic modes, where the encryption or decryption of a block is dependent on the completion of the prior block in a series of blocks. In particular, the Cipher Block Chaining (CBC) mode, which is widely accepted as the only current cryptographic mode suitable for the encryption of packet data, has this property. Thus, pipelined and block-parallel systems are not suited for packet-based cryptography employing the CBC mode. The block-parallel technique can also experience difficulties with other modes, such as the "counter" mode, where certain state information must be shared among multiple sub-units working on the same packet.

It may be possible to modify the block-parallel technique so that all data blocks from a single packet are assigned, in sequence, to the same sub-unit. Assuming that all sub-units have similar performance, this means that short packets (with few data blocks) will finish faster than long packets (with many data blocks), resulting in packets becoming out of order, as short packets get ahead of longer ones. Packet reordering is considered a highly undesirable behavior because it degrades the throughput of the widely used TCP. Thus, such a modified block-parallel technique has significant disadvantages that prevent its successful use.

Flow-parallel systems can handle CBC and similar feedback modes because all related data blocks from a single packet are handled by the same sub-unit. These systems also avoid the problems of packet reordering because all packets from a single flow are processed in order through the same sub-unit. Reordering of packets between flows is considered acceptable behavior because it does not affect TCP throughput. Flow-parallel systems, however, limit the maximum throughput on any flow to the maximum performance of a single sub-unit. As a result, while large aggregate data rates can be achieved for many flows through a single cryptography device, individual flows cannot approach the full throughput of a high bandwidth network interface.

Also, flow-parallel systems can suffer from traffic imbalances among the different sub-units, with some sub-units going unused with no flows currently assigned to them or actually sending traffic enough to fill them, while other sub-units are oversubscribed with several high bandwidth flows that exceed the capacity of the sub-units. Because it is difficult to determine, a priori, what the bandwidth of a given flow will be, the assignment of flows to sub-units will generally be sub-optimal.

Therefore, there is a need for network-speed cryptography that supports current security protocols, such as IPsec, for data protection between entities communicating over a network at full line rate with no reordering.

SUMMARY OF THE INVENTION

Systems and methods consistent with the present invention address this and other needs by providing parallel packet, high performance cryptography. The systems and methods assure that packets are output in the same order in which they were received, thereby avoiding out-of-order packets.

In accordance with the principles of the invention as embodied and broadly described herein, a cryptographic system includes cryptographic sub-units and associated input buffers connected to a scheduler and a reassembler. The input buffers are configured to temporarily store packets, where each of the packets includes one or more data blocks. Each of the sub-units are configured to perform a cryptographic operation on the data blocks from the associated input buffer to form transformed blocks. The scheduler is configured to assign each of the packets to one of the sub-units based on an amount of data stored in the associated input buffer. The reassembler is configured to receive the transformed blocks from the sub-units, reassemble the packets from the transformed blocks, and output the reassembled packets in a same order in which the packets arrived at the scheduler.

In another implementation consistent with the present invention, a cryptographic system includes cryptographic sub-units connected to a scheduler and a reassembler. Each of the sub-units performs a cryptographic operation on data blocks associated with multiple received packets to form transformed blocks. The scheduler receives the packets, identifies the sub-units that would output the packets the soonest, and assigns the packets to the identified sub-units. The reassembler receives the transformed blocks from the sub-units, reassembles the packets from the transformed blocks, and outputs the reassembled packets in a same order in which the packets were received by the scheduler.

In yet another implementation consistent with the present invention, a cryptographic system includes cryptographic sub-units connected to a scheduler and a reassembler. Each of the sub-units performs a cryptographic operation on data blocks associated with multiple packets to form transformed blocks. The scheduler receives the packets, associates a sequence number with each of the packets, and assigns the packets to the sub-units. The reassembler receives the transformed blocks from the sub-units, reassembles the packets from the transformed blocks, orders the packets based on the associated sequence numbers, and outputs the packets in a same order in which the packets were received by the scheduler.

BRIEF DESCRIPTION OF THE DRAWINGS

The accompanying drawings, which are incorporated in and constitute a part of this specification, illustrate the invention and, together with the description, explain the invention. In the drawings.

FIG. 9 is a flowchart of exemplary processing by the cryptography system for cryptography sub-units with different, but predictable, throughputs and latencies according to an implementation consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide parallel packet, high performance cryptography in a network device. The systems and methods assure that packets are output in the same order in which they were received, thereby avoiding out-of-order packets.

EXEMPLARY SYSTEM CONFIGURATION

Figure 1:
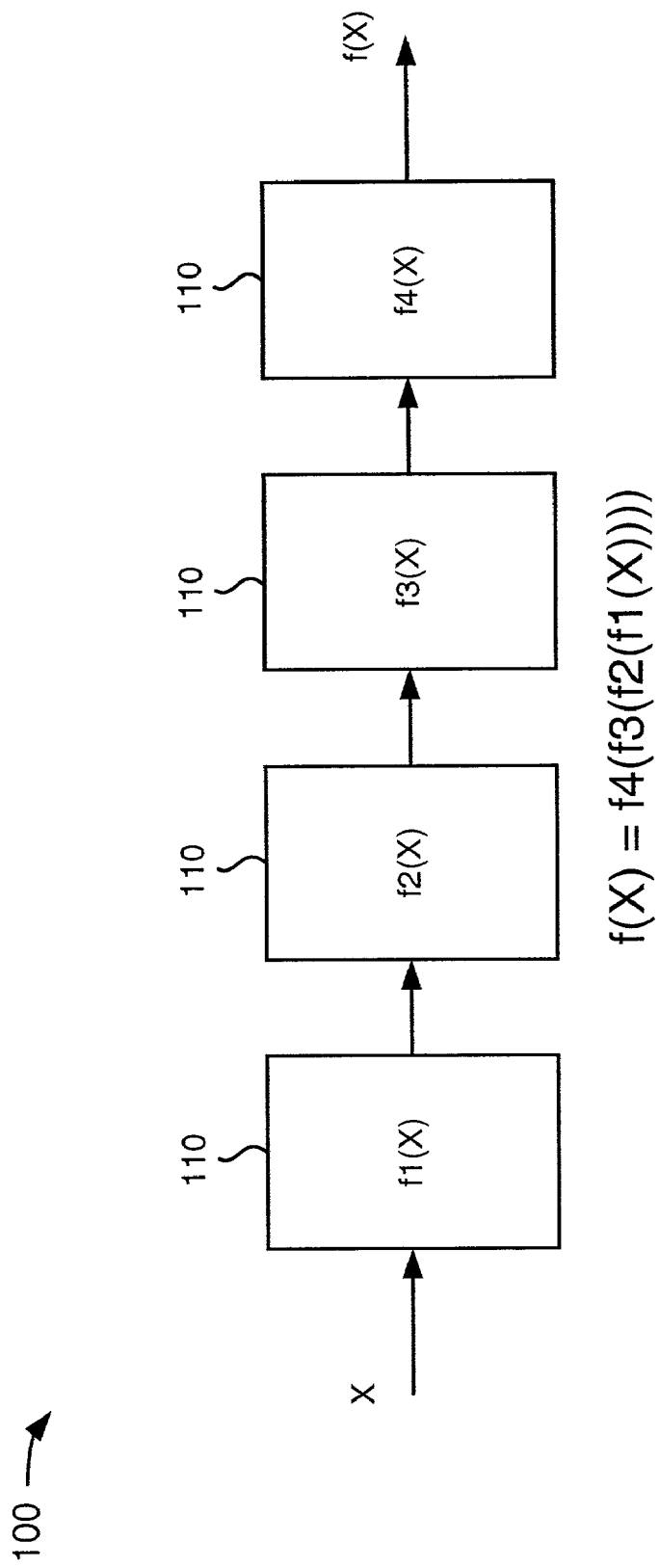
FIG. 1 is a diagram of a conventional pipelined system.
Figure 2:
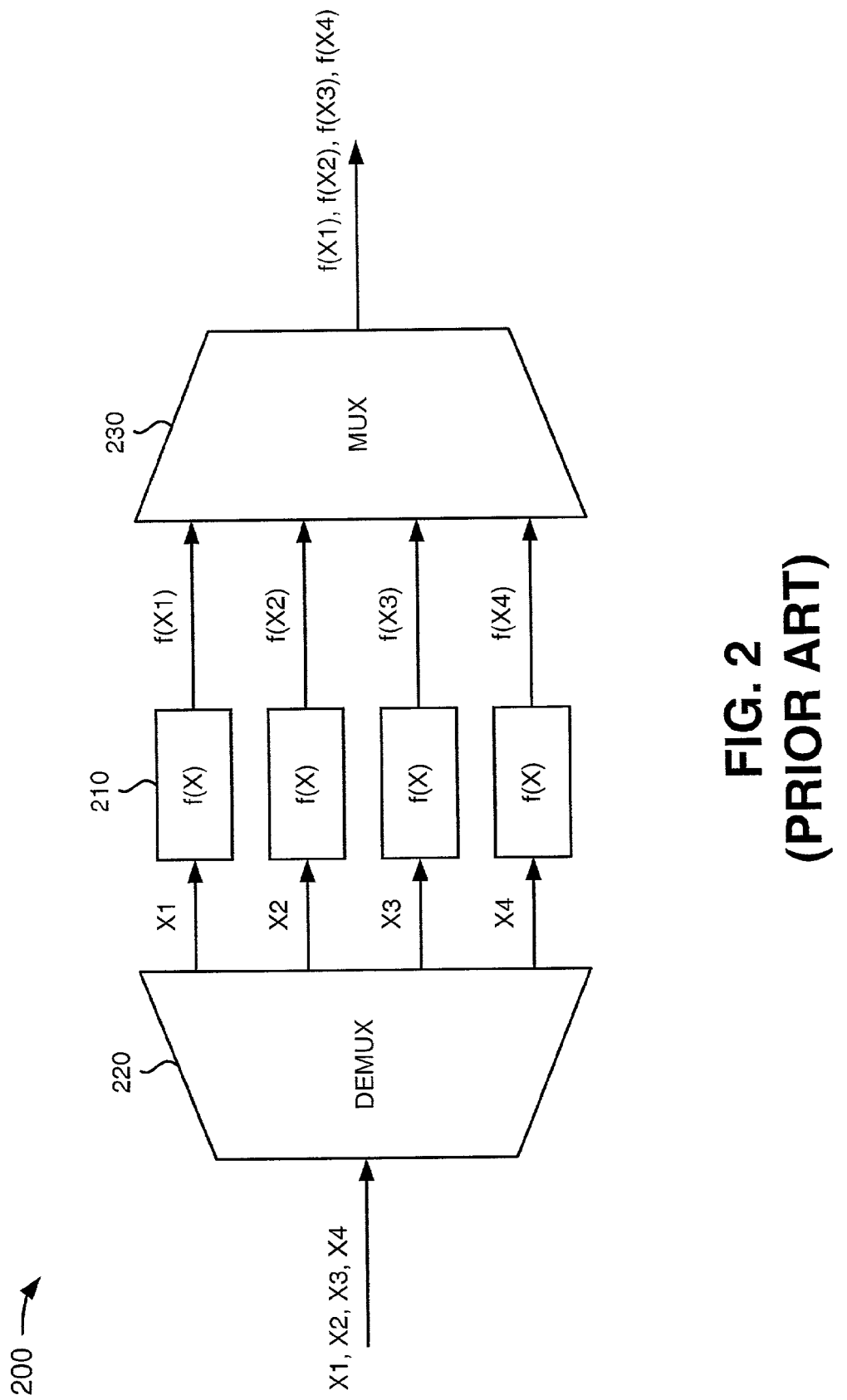
FIG. 2 is a diagram of a conventional block-parallel system.
Figure 3:
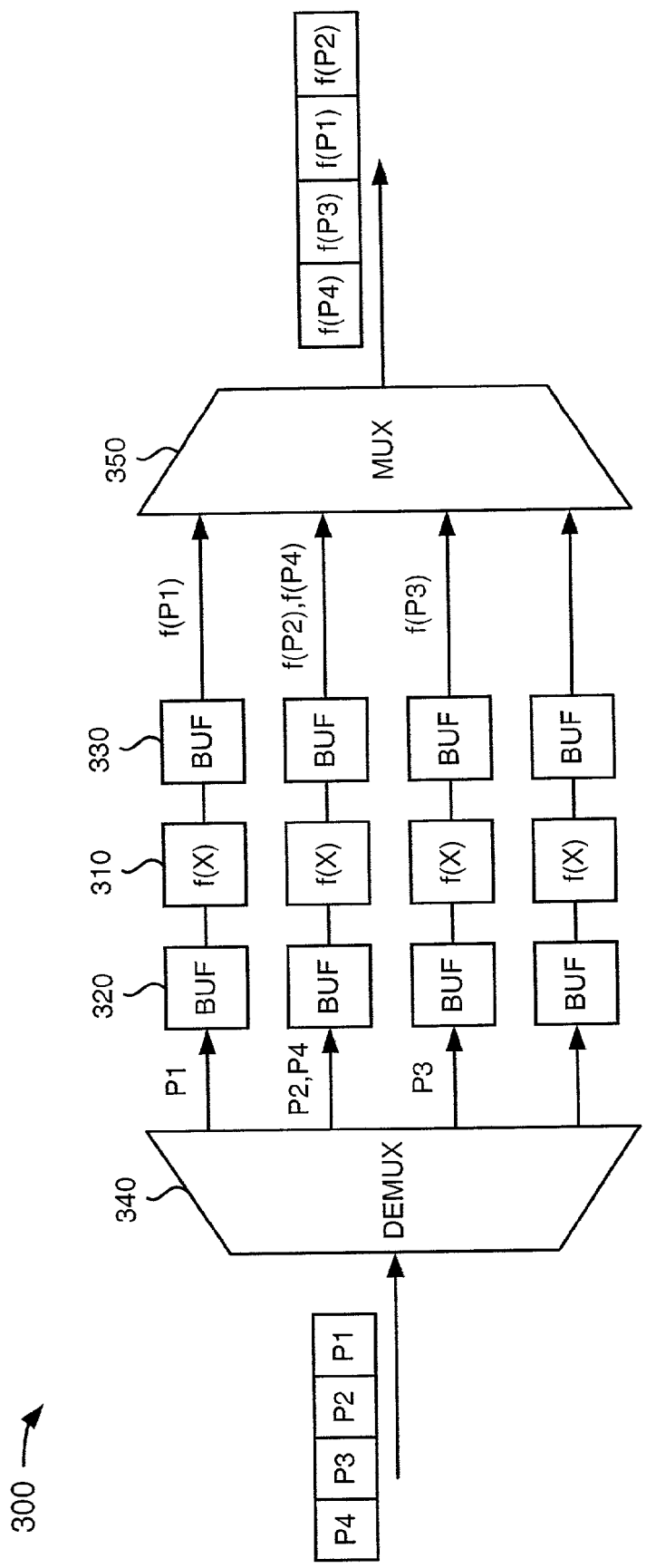
FIG. 3 is a diagram of a conventional flow-parallel system.
Figure 4:
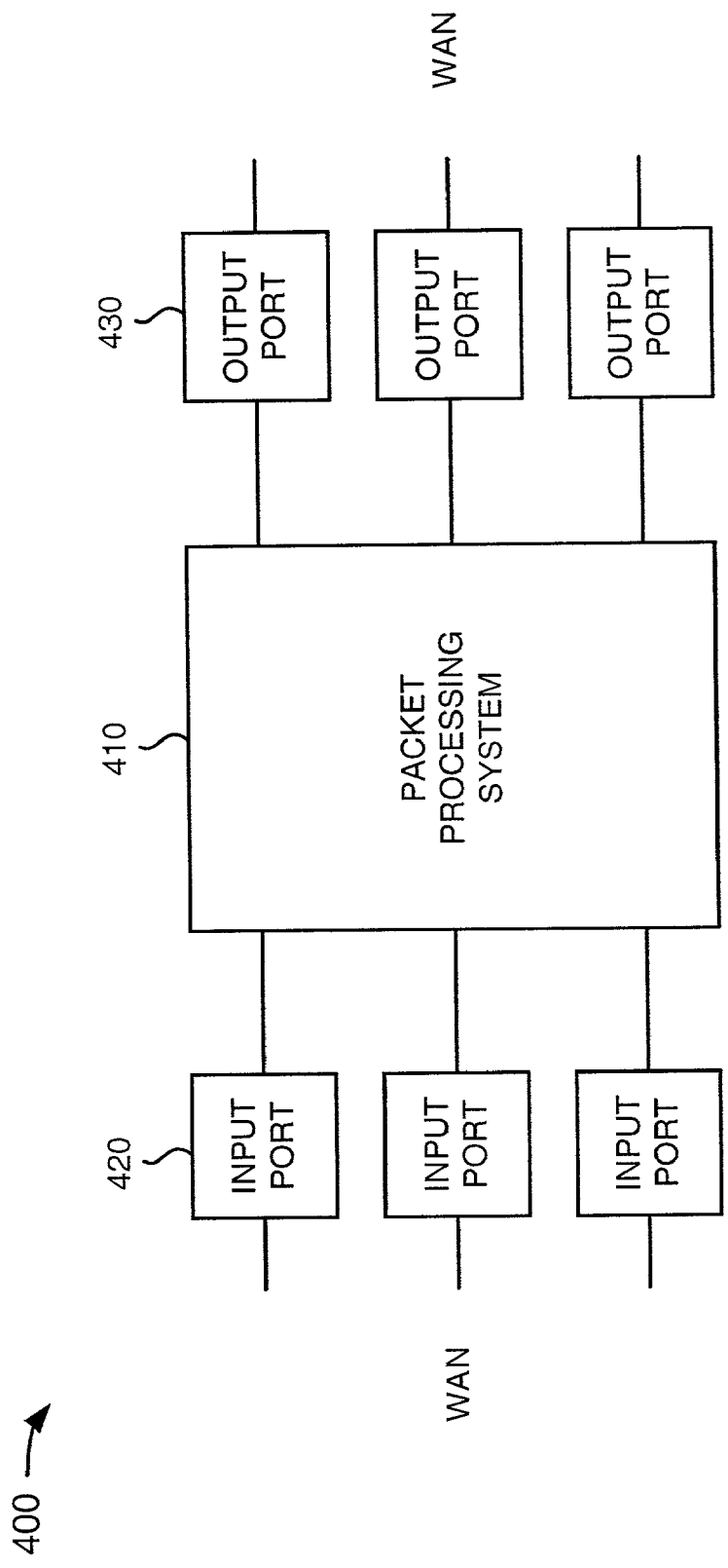
FIG. 4 is an exemplary diagram of a system in which systems and methods consistent with the present invention may be implemented.

FIG. 4 is an exemplary diagram of a system 400 in which systems and methods consistent with the present invention may be implemented. System 400 may take the form of a network device, such as a router, that operates upon packets of information received from a network, such as a wide area network (WAN). In other implementations consistent with the present invention, system 400 takes other forms.

System 400 includes a packet processing system 410 connected to input ports 420 and output ports 430. Input ports 420 may include processing logic to process packets received from a network and/or memory to temporarily store the received packets. For example, input ports 420 may include logic that strips and/or analyzes packet header information. Output ports 430 may include processing logic to process packets for transmission to the network and/or memory to temporarily store the packets prior to transmission. For example, output ports 430 may include logic that forms a packet by adding proper packet header information according to the protocol(s) used by the network.

Packet processing system 410 may include one or more mechanisms for processing packets and/or routing packets from input ports 420 to output ports 430. For example, packet processing system 410 may include switching fabric to route packets from input ports 420 to output ports 430, one or more memory devices to temporarily store the packets, and/or one or more packet processors to analyze the packets, obtain routing information for the packets, and, possibly, perform certain service-related (e.g., quality of service) functions.

Figure 5:
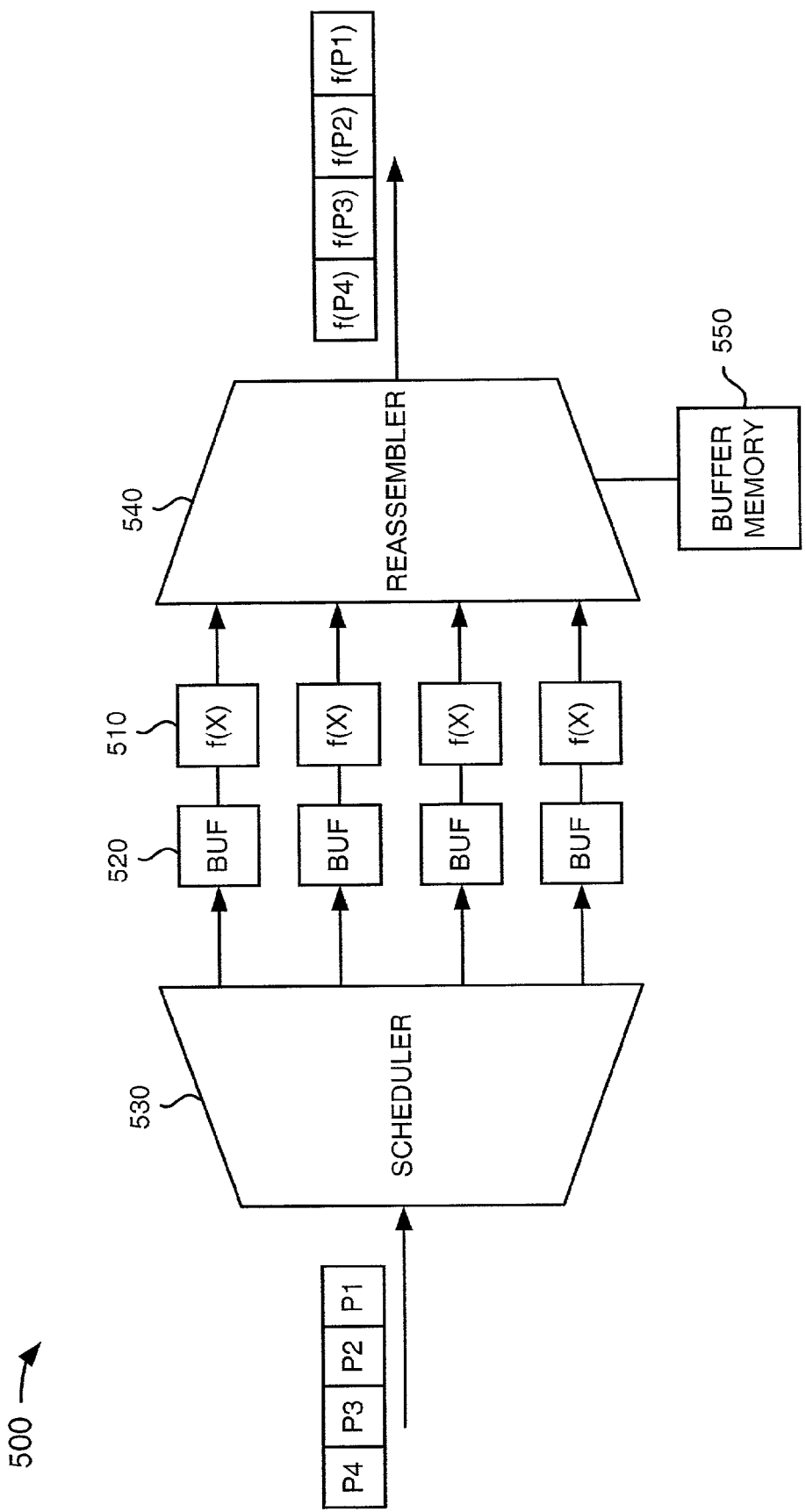
FIG. 5 is an exemplary diagram of a cryptography system consistent with the principles of the invention.

In an implementation consistent with the present invention, packet processing system 410 includes a cryptography system that performs cryptography operations, such as encryption and decryption, on packets received by system 400. FIG. 5 is an exemplary diagram of a cryptography system 500 consistent with the principles of the invention. For the description that follows, assume that received packets are divided into blocks and that packet framing data (i.e., whether the block is the first, middle, or last block of a packet) accompanies each block.

Cryptography system 500 includes multiple cryptographic sub-units 510 and corresponding input buffers 520 connected between scheduler 530 and reassembler 540. Scheduler 530 may include logic that receives blocks of packets and assigns them to the cryptographic sub-units 510. Scheduler 530 may assign all of the blocks of a packet to the same sub-unit 510. Input buffers 520 may include a memory device, such as a first-in first-out (FIFO) memory, that stores the packet framing data along with the packet block. All of input buffers 520 may be of the same size and may be assigned out of a common memory using, for example, well known buffer management techniques.

Each of cryptographic sub-units 510 may include logic that takes blocks from input buffer 520, performs a cryptographic operation (e.g., encryption or decryption) on the blocks, and outputs the transformed blocks along with their packet framing data to reassembler 540. Reassembler 540 may include logic that resequences and reassembles packets and outputs them in a single stream in the same order that the packets arrived at scheduler 530. Reassembler 540 may include a buffer memory 550 that temporarily stores packet blocks in a reassembly (or output) queue until the packets are ready to be output from cryptography system 500. The reassembly queue may be organized in many ways, such as a two-dimensional linked list.

Figure 6:
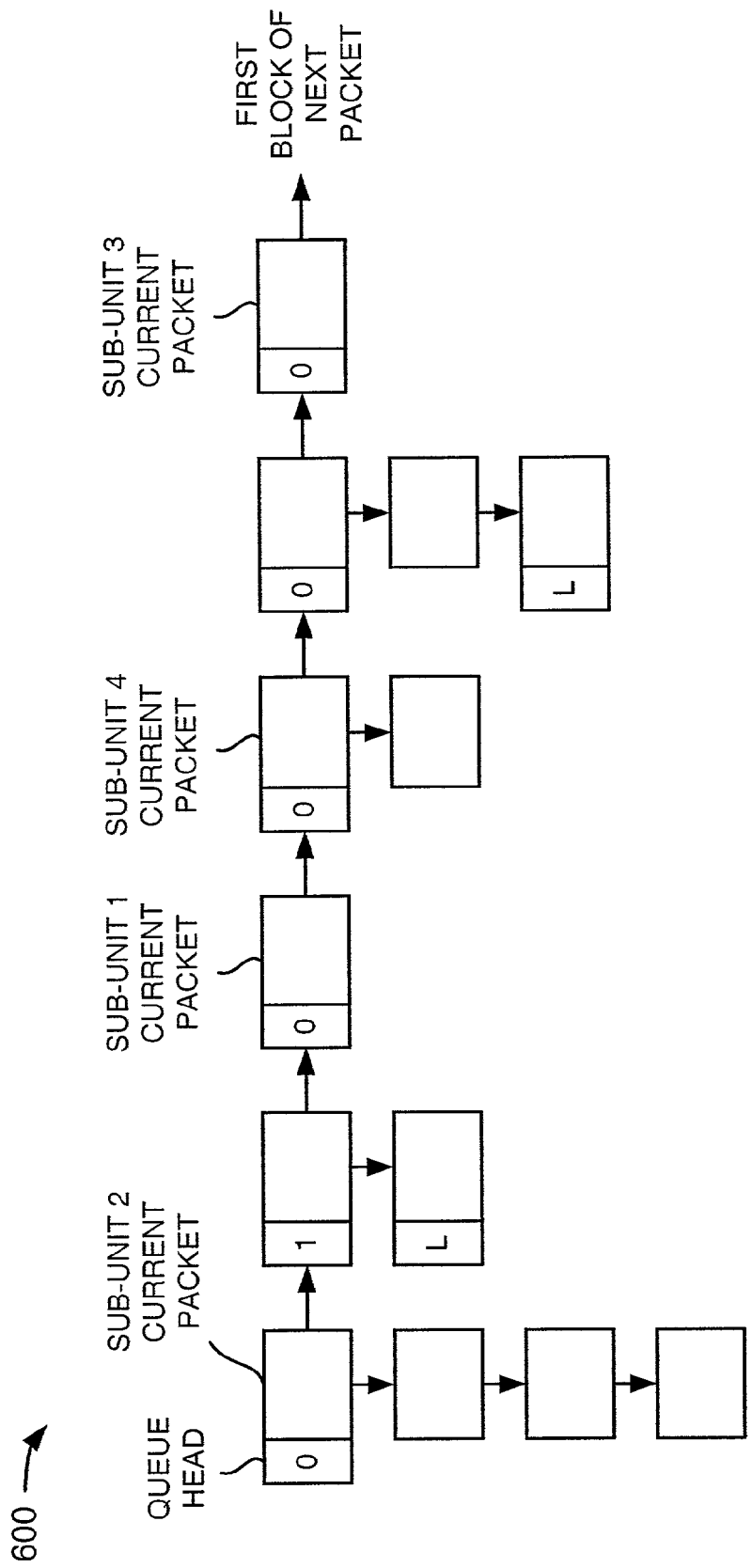
FIG. 6 is an exemplary diagram of a reassembly queue according to an implementation consistent with the present invention.

FIG. 6 is an exemplary diagram of a reassembly queue 600 according to an implementation consistent with the present invention. In this implementation, reassembly queue 600 is organized as a two-dimensional linked list. In other words, blocks of a packet may be stored in non-contiguous locations within queue 600 and contain pointers that link the packet blocks together. Further, individual packets may be linked together based on their output order.

The queue 600 may maintain a set of pointers corresponding to sub-units 510. Each of these pointers may identify the current packet being processed by corresponding sub-unit 510. Queue 600 may use these current packet pointers to facilitate the matching of blocks of a packet in sequence as they are output by sub-unit 510. For example, a current packet pointer may point to the last packet block stored in queue 600 so that subsequent blocks of the same packet output from sub-unit 510 may be matched with the already-stored blocks of the packet.

Each of the first packet blocks in queue 600 may include a flag "1" that indicates that the packet is complete (i.e., all of the packet blocks have been processed by the responsible sub-unit 510) or a flag "0" that indicates that the packet is still in progress (i.e., not all of the packet blocks have been processed by the responsible sub-unit 510). Further, the final packet blocks in queue 600 may include a flag "L" that indicates that it is the last block of the packet. These flags may be encoded in various ways, such as using bits in the linked list pointers or using bits separate from the pointers.

The two-dimensional linked list structure is one of many possible ways to implement reassembly queue 600. Further, it is possible for there to be more packets in queue 600 than there are sub-units 510, though the number of in-progress packets should not exceed the number of sub-units 510.

Returning to FIG. 5, the functions performed by the components of cryptography system 500 may differ based on the throughputs and latencies of cryptographic sub-units 510. Three implementations will be described below: (1) sub-units 510 have the same constant throughput and latency; (2) sub-units 510 have possibly different, but predictable, throughputs and latencies; and (3) sub-units 510 have unpredictable throughputs and latencies.

CONSTANT THROUGHPUT AND LATENCY

Figure 7:
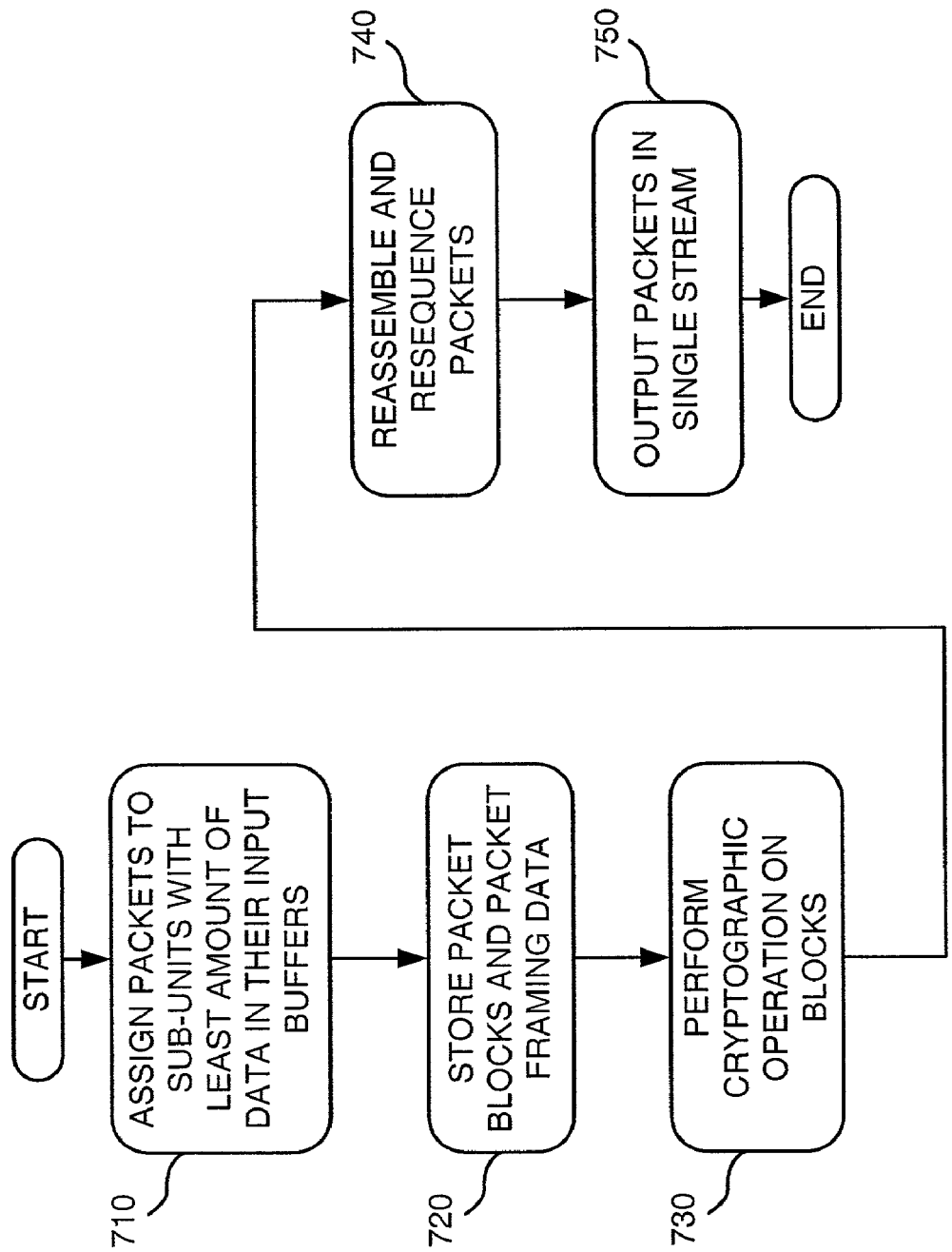
FIG. 7 is a flowchart of exemplary processing by the cryptography system for cryptography sub-units with the same constant throughput and latency according to an implementation consistent with the present invention.

In this implementation, cryptographic sub-units 510 have the same constant throughput and latency. FIG. 7 is a flowchart of exemplary processing by cryptography system 500 according to this implementation consistent with the present invention. Processing may begin when scheduler 530 receives a flow of packets. Each of the packets may include one or more packet blocks and accompanying packet framing data.

Scheduler 530 assigns each arriving packet to cryptographic sub-unit 510 with the least amount of data currently stored in its input buffer 520 (act 710). If more than one sub-unit 510 qualifies, then scheduler 530 may use an arbitration algorithm to select one of sub-units 510. If the packet will not fit into input buffer 520 of assigned sub-unit 510, the scheduler 530 may hold the packet until there is sufficient room. This may assure that the beginning block of the packet will be processed through sub-unit 510 after the beginning blocks of all packets preceding it through scheduler 530 and before the beginning blocks of any packets following it.

Scheduler 530 stores the packet blocks and accompanying framing data in input buffer 520 of assigned sub-unit 510 (act 720). Assigned sub-unit 510 reads each of the packet blocks and accompanying framing data from input buffer 520 and performs a cryptographic operation on the blocks (act 730). For example, sub-unit 510 may perform an encryption or decryption operation on a packet block and output the transformed block, along with the framing data, to reassembler 540.

Figure 8:
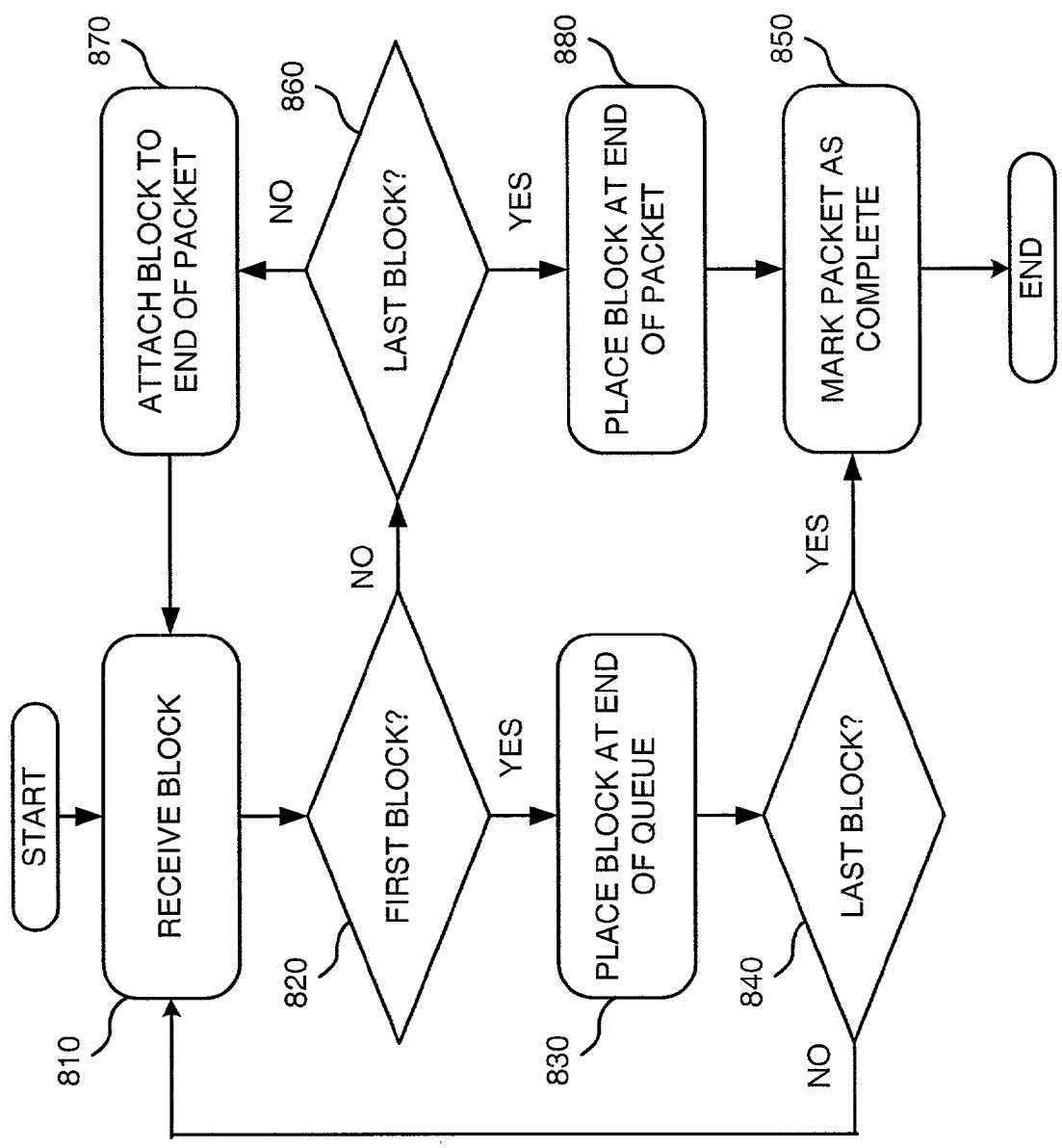
FIG. 8 is a flowchart of exemplary processing by the reassembler of FIG. 5 according to an implementation consistent with the present invention.

Reassembler 540 reassembles the blocks into packets and resequences the packets as necessary to assure that the packets are output in the same order in which they arrived at scheduler 530 (act 740). FIG. 8 is a flowchart of exemplary processing by which reassembler 540 reassembles and resequences packets according to an implementation consistent with the present invention. Processing may begin when reassembler 540 receives a completed block (i.e., a packet block that has been processed by a cryptographic sub-unit 510) from a sub-unit 510 (act 810).

Reassembler 540 may determine whether the completed block is the first block of a packet (act 820). If the completed block is the first block of a packet, reassembler 540 may store the block at the end of reassembly queue 600 (FIG. 6) (act 830). Reassembler 540 may then set the current packet pointer associated with this sub-unit 510 to point to this block so that subsequent packet blocks output by that sub-unit 510, until the end of the packet, can be attached in sequence to the first block of the packet.

Reassembler 540 may then determine whether the completed block is also the last block of the packet (act 840). If the completed block is not the last block of the packet, reassembler 540 may return to act 810 to await receipt of the next packet block. If the completed block is the last block of the packet, however, reassembler 540 may mark the packet as complete by, for example, setting its flag to "1" (act 850) and the processing may end. In an alternative viewpoint, reassembly 540 may return to act 810 to await receipt of the first block of the next packet.

Returning to act 820, if the completed block is not the first block of the packet, reassembler 540 determines whether the completed block is the last block of the packet (act 860). If the completed block is not the last block of the packet, reassembler 540 may attach the block to the end of the packet indicated by the current packet pointer corresponding to sub-unit 510 from which it received the block (act 870). Reassembler 540 may do this by storing the completed block in reassembly queue 600 and modifying a pointer from the most recently stored block of this packet to point to the completed block. Reassembler 540 may then return to act 810 to await receipt of the next packet block.

If the completed block is the last block of the packet, reassembler 540 may place the last block at the end of the packet indicated by the current packet pointer corresponding to sub-unit 510 from which it received the block (act 880). Reassembler 540 may do this by storing the last block in reassembly queue 600 and modifying a pointer from the most recently stored block of this packet to point to the last block. Reassembler 540 may then mark the packet as complete by, for example, setting its flag to "1" (act 850) and the processing may end. In the alternative view, reassembler 540 may return to act 810 to await receipt of the first block of the next packet.

Returning to FIG. 7, once the packet at the head of reassembly queue 600 is marked as complete, reassembler 540 removes the packet and outputs it in a single stream of packets (act 750). Because scheduler 530 guarantees that initial packet blocks arrive at reassembler 540 in an unambiguous and correctly-sequenced order, the packets are output in the same order as they arrived at scheduler 530, after a variable time delay.

PREDICTABLE THROUGHPUT AND LATENCY

In this implementation, cryptographic sub-units 510 have possibly different, but predictable, throughputs and latencies. FIG. 9 is a flowchart of exemplary processing by the cryptography system according to this implementation consistent with the present invention. Processing may begin when scheduler 530 receives a flow of packets. Each of the packets may include one or more packet blocks and accompanying packet framing data.

Scheduler 530 may determine the output time of the first block of a packet (act 910). Scheduler 530 may make this determination based on the current amount of data buffered in input buffer 520 of each cryptographic sub-unit 510 and knowledge of the behavior of sub-units 510. Scheduler 530 may then assign the packet to sub-unit 510 that would output it the soonest (act 920). If more than one sub-unit 510 qualifies, then scheduler 530 may use an arbitration algorithm to select one of sub-units 510.

If the output time would be earlier, or the same as, the output time of the first block of a prior packet processed by scheduler 530, then scheduler 530 may delay the placing of the first block of the packet into input buffer 520 of selected sub-unit 510 until the first block's output time becomes distinctly greater than the output time of the first block of the prior packet.

Scheduler 530 stores the packet blocks and accompanying framing data in input buffer 520 of assigned sub-unit 510 (act 930). Assigned sub-unit 510 reads each of the packet blocks and accompanying framing data from input buffer 520 and performs a cryptographic operation on the blocks (act 940). For example, sub-unit 510 may perform an encryption or decryption operation on a packet block and output the transformed block, along with the framing data, to reassembler 540.

Reassembler 540 reassembles the blocks into packets and resequences the packets as necessary to assure that the packets are output in the same order in which they arrived at scheduler 530 (act 950). To do this, reassembler 540 may perform acts similar to those described with regard to FIG. 8. In this implementation, it is possible for several packet blocks to complete in different sub-units 510 at the same time. Scheduler 530 assures, however, that no two first blocks will complete at the same time by delaying, if necessary, the storing of a first block in input buffer 520 of an assigned sub-unit 510. This aids reassembler 540 in keeping the packets in the same order in which they arrived at scheduler 530.

Once the packet at the head of reassembly queue 600 is marked as complete, reassembler 540 removes the packet and outputs it in a single stream of packets (act 960). Because first packet blocks are guaranteed to come out in an unambiguous and correctly-sequenced order, the packets are output in the same order as they arrived at scheduler 530, after a variable time delay.

UNPREDICTABLE THROUGHPUT AND LATENCY

Figure 10:
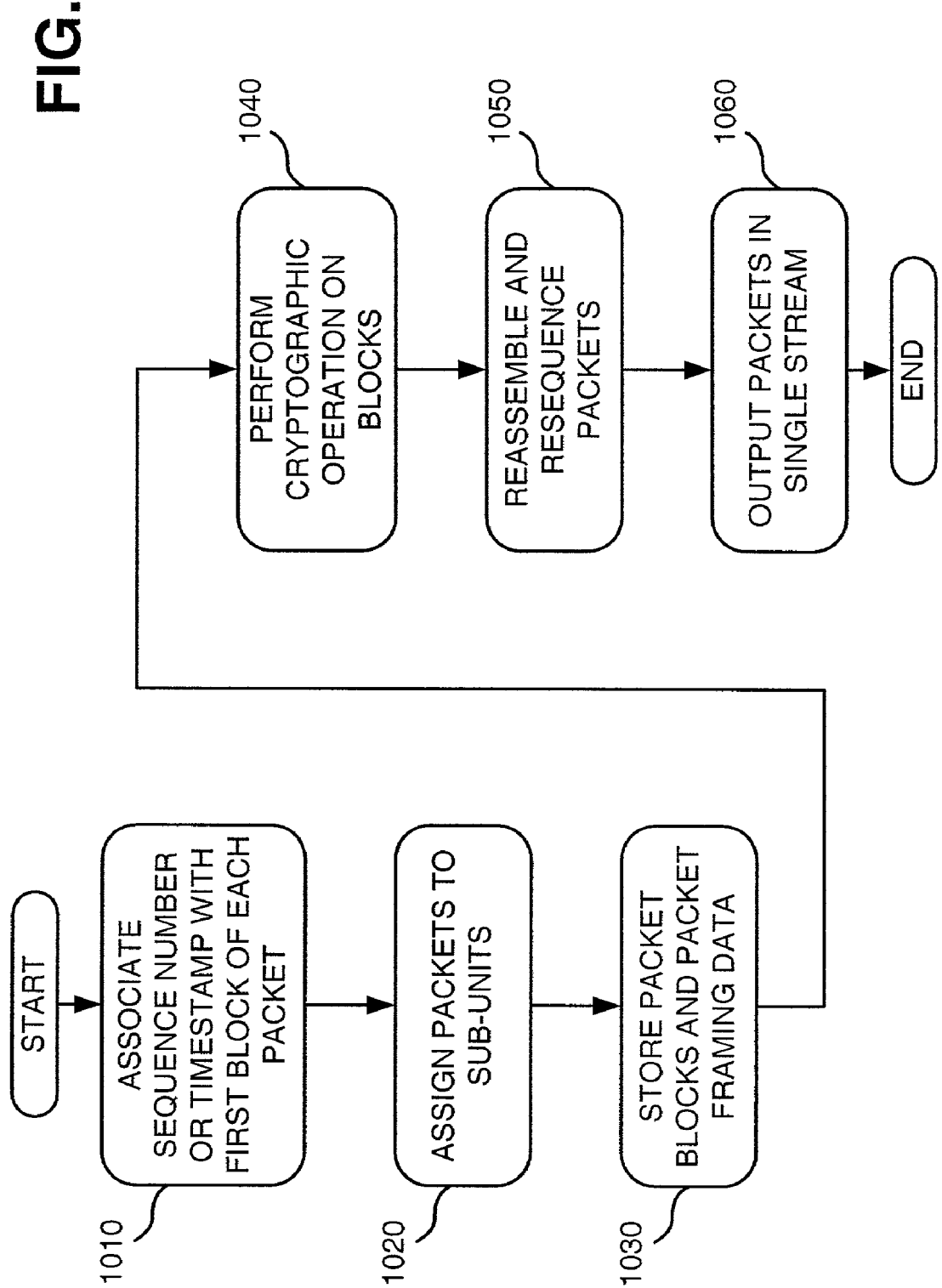
FIG. 10 is a flowchart of exemplary processing by the cryptography system for cryptography sub-units with unpredictable throughputs and latencies according to an implementation consistent with the present invention.

In this implementation, cryptographic sub-units 510 have possibly different and unpredictable throughputs and latencies. This implementation may also apply to the situation in which the computation of the output ordering is unreasonably complex. FIG. 10 is a flowchart of exemplary processing by the cryptography system according to this implementation consistent with the present invention. Processing may begin when scheduler 530 receives a flow of packets. Each of the packets may include one or more packet blocks and accompanying packet framing data.

Scheduler 530 may associate a monotonically increasing sequence number or a correctly ordered, worst-case completion time timestamp with the first block of each arriving packet (act 1010). Scheduler 530 may then assign the packets to cryptographic sub-units 510 using any well known technique, such as a round robin distribution (act 1020).

Scheduler 530 stores the packet blocks and accompanying framing data in input buffer 520 of assigned sub-unit 510 (act 1030). Assigned sub-unit 510 reads each of the packet blocks and accompanying framing data from input buffer 520 and performs a cryptographic operation on the blocks (act 1040). For example, sub-unit 510 may perform an encryption or decryption operation on a packet block and output the transformed block, along with the framing data, to reassembler 540.

Figure 11:
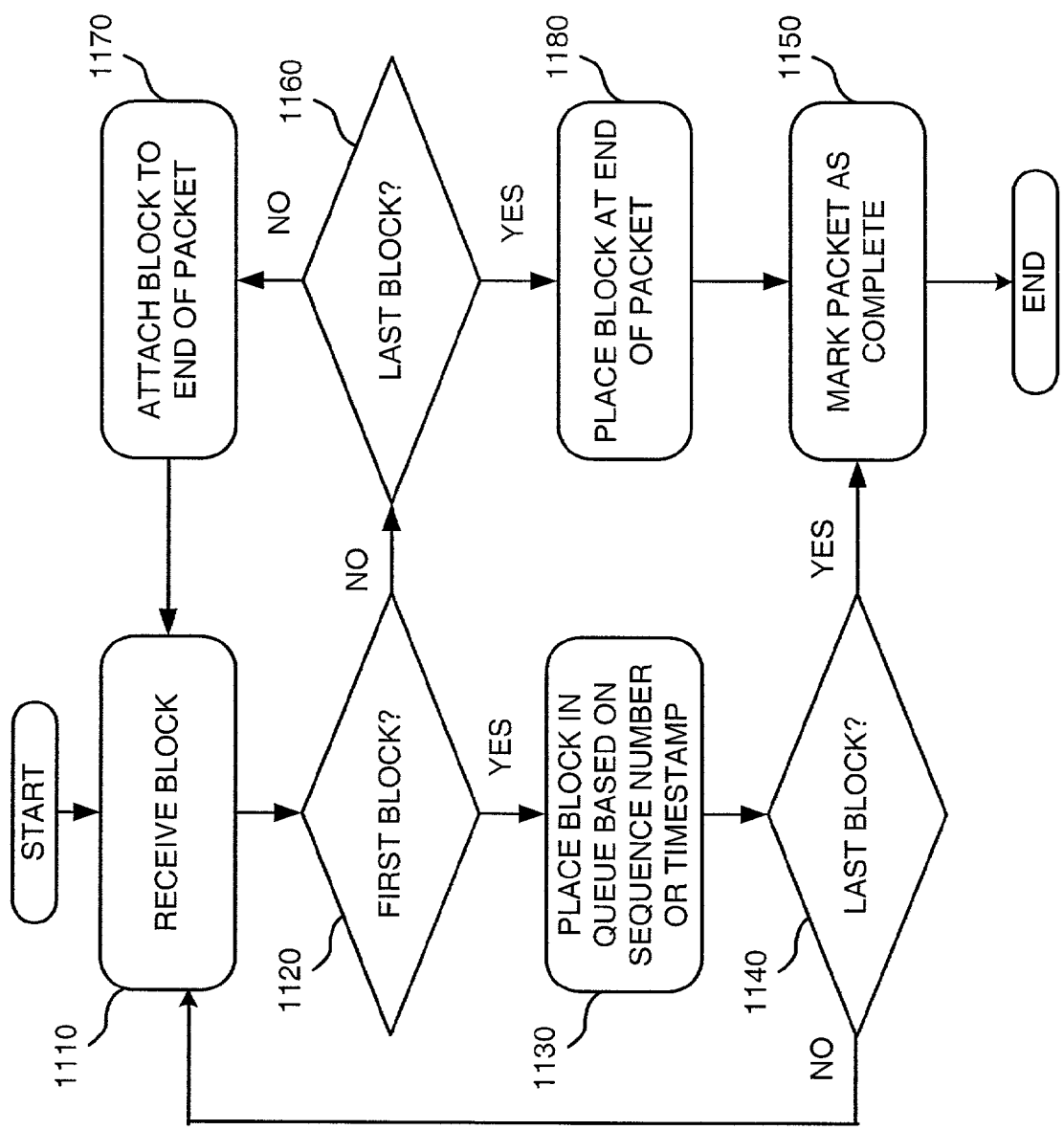
FIG. 11 is a flowchart of exemplary processing by the reassembler of FIG. 5 for cryptography sub-units with unpredictable throughputs and latencies according to an implementation consistent with the present invention.

Reassembler 540 reassembles the blocks into packets and resequences the packets as necessary to assure that the packets are output in the same order in which they arrived at the scheduler 530 (act 1050). FIG. 11 is a flowchart of exemplary processing by which reassembler 540 reassembles and resequences packets according to an implementation consistent with the present invention. Processing may begin when reassembler 540 receives a completed block (i.e., a packet block that has been processed by a cryptographic sub-unit 510) from a sub-unit 510 (act 1110).

Reassembler 540 may determine whether the completed block is the first block of a packet (act 1120). If the completed block is the first block of a packet, reassembler 540 may store the block in reassembly queue 600 (FIG. 6) based on its sequence number or timestamping (act 1130). In this implementation, the first blocks are sorted in reassembly queue 600 in increasing sequence number or timestamp order. Reassembler 540 may then set the current packet pointer associated with this sub-unit 510 to point to this block so that subsequent packet blocks output by that sub-unit 510, until the end of the packet, can be attached in sequence to the first block of the packet.

Reassembler 540 may then determine whether the completed block is also the last block of the packet (act 1140). If the completed block is not the last block of the packet, reassembler 540 may return to act 1110 to await receipt of the next packet block. If the completed block is the last block of the packet, however, reassembler 540 may mark the packet as complete by, for example, setting its flag to "1" (act 1150) and the processing may end. From an alternative viewpoint, reassembler 540 may return to act 1110 to await receipt of the first block of the next packet.

Returning to act 1120, if the completed block is not the first block of the packet, reassembler 540 determines whether the completed block is the last block of the packet (act 1160). If the completed block is not the last block of the packet, reassembler 540 may attach the block to the end of the packet indicated by the current packet pointer corresponding to sub-unit 510 from which it received the block (act 1170). Reassembler 540 may do this by storing the completed block in reassembly queue 600 and modifying a pointer from the most recently stored block of this packet to point to the completed block. Reassembler 540 may then return to act 1110 to await receipt of the next packet block.

If the completed block is the last block of the packet, reassembler 540 may place the last block at the end of the packet indicated by the current packet pointer corresponding to sub-unit 510 from which it received the block (act 1180). Reassembler 540 may do this by storing the last block in reassembly queue 600 and modifying a pointer from the most recently stored block of this packet to point to the last block. Reassembler 540 may then mark the packet as complete by, for example, setting its flag to "1" (act 1150) and the processing may end. From an alternative viewpoint, reassembler 540 may return to act 1110 to await receipt of the first block of the next packet.

Returning to FIG. 10, once the packet at the head of reassembly queue 600 is marked as complete and the sequence number is the next one in sequence or the value of the timestamp is less than or equal to the current time, reassembler 540 removes the packet and outputs it in a single stream of packets (act 1060). Reassembler 540 may then discard the associated sequence number or timestamp.

CONCLUSION

Systems and methods consistent with the present invention provide parallel packet, high performance cryptography for systems that include: (1) cryptographic sub-units with the same constant throughput and latency; (2) cryptographic sub-units with possibly different, but predictable, throughputs and latencies; and (3) cryptographic sub-units with unpredictable throughputs and latencies. The systems and methods assure that packets are output in the same order in which they were received, thereby avoiding out-of-order packets.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 7-11, the order of the acts may differ in other implementations consistent with the present invention.

In the preceding description, reassembler 540 has been described as including a reassembly queue 600 to facilitate the reassemble and resequencing of packets. In an alternate implementation consistent with the principles of the invention, each of sub-units 510 may include an output memory, such as a FIFO or a ring buffer, and associate a "packet finished" state with each packet at the front of the output memory. In this case, reassembler 540 may track the ordering of first blocks of packets in the output memories. To accomplish this, reassembler 540 may maintain a list of sub-units 510 from which to take packets. Each sub-unit 510 may appear in the list more than once. Using this technique, reassembler 540 would track when packets started and ended, but would not be concerned with the middle blocks of the packets.

Also, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A cryptographic system, comprising:
   a plurality of input buffers configured to temporarily store a plurality of packets, each of the packets including one or more data blocks;
   a plurality of cryptographic sub-units associated with the input buffers, each of the sub-units being configured to perform a cryptographic operation on the data blocks from the associated input buffer to form transformed blocks;
   a scheduler configured to assign each of the packets to one of the sub-units, as an assigned sub-unit, based on an amount of data stored in the associated input buffer; and
   a reassembler configured to:
      receive the transformed blocks from the assigned sub-units;
      reassemble the packets from the transformed blocks to form reassembled packets, and
      output the reassembled packets in a same order in which the packets arrived at the scheduler.

2. The system of claim 1, wherein the cryptographic operation includes one of an encryption operation and a decryption operation.

3. The system of claim 1, wherein the scheduler is further configured to:
   determine whether the packet will fit in the associated input buffer of the assigned sub-unit, and
   delay storing of the packet in the associated input buffer until the packet is determined to fit in the associated input buffer.

4. The system of claim 1, wherein each of the sub-units has a same constant throughput and latency.

5. The system of claim 4, wherein the scheduler is configured to:

identify one of the input buffers, as an identified input buffer, with a least amount of stored data, and assign a next one of the packets to the sub-unit associated with the identified input buffer.

6. The system of claim 1, wherein the reassembler is configured to:

receive one of the transformed blocks for one of the packets from the assigned sub-unit, determine whether the transformed block is a first data block in the packet, and store the transformed block at an end of an output queue when the transformed block is the first data block in the packet.

7. The system of claim 6, wherein the reassembler is further configured to:

determine whether the transformed block is also a last data block in the packet when the transformed block is the first data block in the packet, and mark the packet as complete when the transformed block is the last data block in the packet.

8. The system of claim 6, wherein the reassembler is further configured to:

determine whether the transformed block is a last data block in the packet when the transformed block is not the first data block in the packet, and attach the transformed block to an end of the packet when the transformed block is not the last data block in the packet.

9. The system of claim 6, wherein the reassembler is further configured to:

determine whether the transformed block is a last data block in the packet when the transformed block is not the first data block in the packet, attach the transformed block to an end of the packet when the transformed block is the last data block in the packet, and mark the packet as complete.

10. The system of claim 1, wherein the scheduler is further configured to perform an arbitration if more than one of the sub-units qualifies for assignment of a packet.

11. A cryptographic system, comprising:

means for receiving a plurality of packets, each of the packets including one or more data blocks;

means for assigning each of the packets to one of a plurality of input buffers based on an amount of data stored in the input buffer;

means for performing a cryptographic operation on the data blocks from each of the input buffers to form transformed blocks;

means for reassembling the packets from the transformed blocks to form reassembled packets; and means for outputting the reassembled packets in a same order in which the packets were received.

12. A cryptographic method, comprising:

receiving a plurality of packets, each of the packets including one or more data blocks;

assigning each of the packets to one of a plurality of input buffers, as an assigned input buffer, based on an amount of data stored in the input buffer;

storing the data blocks in the assigned input buffers;

performing a cryptographic operation on the data blocks from each of the input buffers to form transformed blocks;

reassembling the packets from the transformed blocks to form reassembled packets; and outputting the reassembled packets in a same order in which the packets were received.

13. The method of claim 12, wherein the performing a cryptographic operation includes:

performing one of an encryption operation and a decryption operation.

14. The method of claim 12, wherein the storing the data blocks includes:

determining whether all the data blocks of a packet will fit in the assigned input buffer, and delaying the storing of the data blocks in the assigned input buffer until all the data blocks of the packet are determined to fit in the assigned input buffer.

15. The method of claim 12, wherein the assigning each of the packets includes:

identifying one of the liquid buffers, as an identified input buffer, with a least amount of stored data, and assigning a next one of the packets to the identified input buffer.

16. The method of claim 12, wherein the outputting the reassembled packets includes:

outputting the reassembled packets in a single packet stream.

17. The method of claim 12, wherein the reassembling the packets includes:

receiving one of the transformed blocks for one of the packets, determining whether the transformed block is a first data block in the packet, and storing the transformed block at an end of an output queue when the transformed block is the first data block in the packet.

18. The method of claim 17, wherein the reassembling the packets further includes:

determining whether the transformed block is also a last data block in the packet when the transformed block is the first data block in the packet, and marking the packet as complete when the transformed block is the last data block in the packet.

19. The method of claim 17, wherein the reassembling the packets further includes:

determining whether the transformed block is a last data block in the packet when the transformed block is not the first data block in the packet, and attaching the transformed block to an end of the packet when the transformed block is not the last data block in the packet.

20. The method of claim 17, wherein the reassembling the packets further includes:

determining whether the transformed block is a last data block in the packet when the transformed block is not the first data block in the packet, attaching the transformed block to an end of the packet when the transformed block is the last data block in the packet, and marking the packet as complete.

21. The method of claim 12, wherein assigning each of the packets to one of the input buffers further comprises performing an arbitration if more than one of the sub-units qualifies for assignment of a packet.

22. A network device, comprising:

a plurality of input ports configured to receive a plurality of packets;

a plurality of output ports configured to transmit the packets; and a packet processing system configured to transmit the packets from the input ports to the output ports, the packet processing system comprising:

a plurality of input buffers configured to temporarily store the packets, each of the packets including one or more data blocks, a plurality of cryptographic sub-units associated with the input buffers, each of the sub-units being configured to perform a cryptographic operation on the data blocks from the associated input buffer to form transformed blocks, a scheduler configured to assign each of the packets to one of the sub-units based on an amount of data stored in the associated input buffer, and a reassembler configured to:
 receive the transformed blocks from the sub-units,
 reassemble the packets from the transformed blocks, and
 output the reassembled packets in a same order in which the packets arrived at the scheduler.

\* \* \* \* \*